United States Patent

[11] 3,577,763

[72] Inventor John O. Beal
 Pacific Grove, Calif.
[21] Appl. No. 829,405
[22] Filed June 2, 1969
[45] Patented May 4, 1971
[73] Assignee Monterey Research Laboratory, Inc.
 Monterey, Calif.

[54] APPARATUS FOR SELECTIVELY PROGRAMMING DIFFERENT TYPES OF SHOCK TESTS
 7 Claims, 8 Drawing Figs.

[52] U.S. Cl. ........................................... 73/12
[51] Int. Cl. ........................................... G01n 3/08
[50] Field of Search ............................... 73/12

[56] References Cited
UNITED STATES PATENTS
3,402,593 9/1968 Bresk et al. ............... 73/11

Primary Examiner—Richard C. Queisser
Assistant Examiner—John Whalen
Attorneys—Jack M. Wiseman and Thomas E. Schatzel

ABSTRACT: Apparatus for selectively programming different types of shock tests in which a movable shock table is moved toward a reaction mass. A programmer in series with the shock table and the reaction mass controls the shock pulse produced by the impact between the shock table, the programmer and the reaction mass. The movable shock table is formed with a gas filled chamber. The programmer includes a piston and an elastomer assembly. The piston is received by the gas filled chamber formed in the movable shock table.

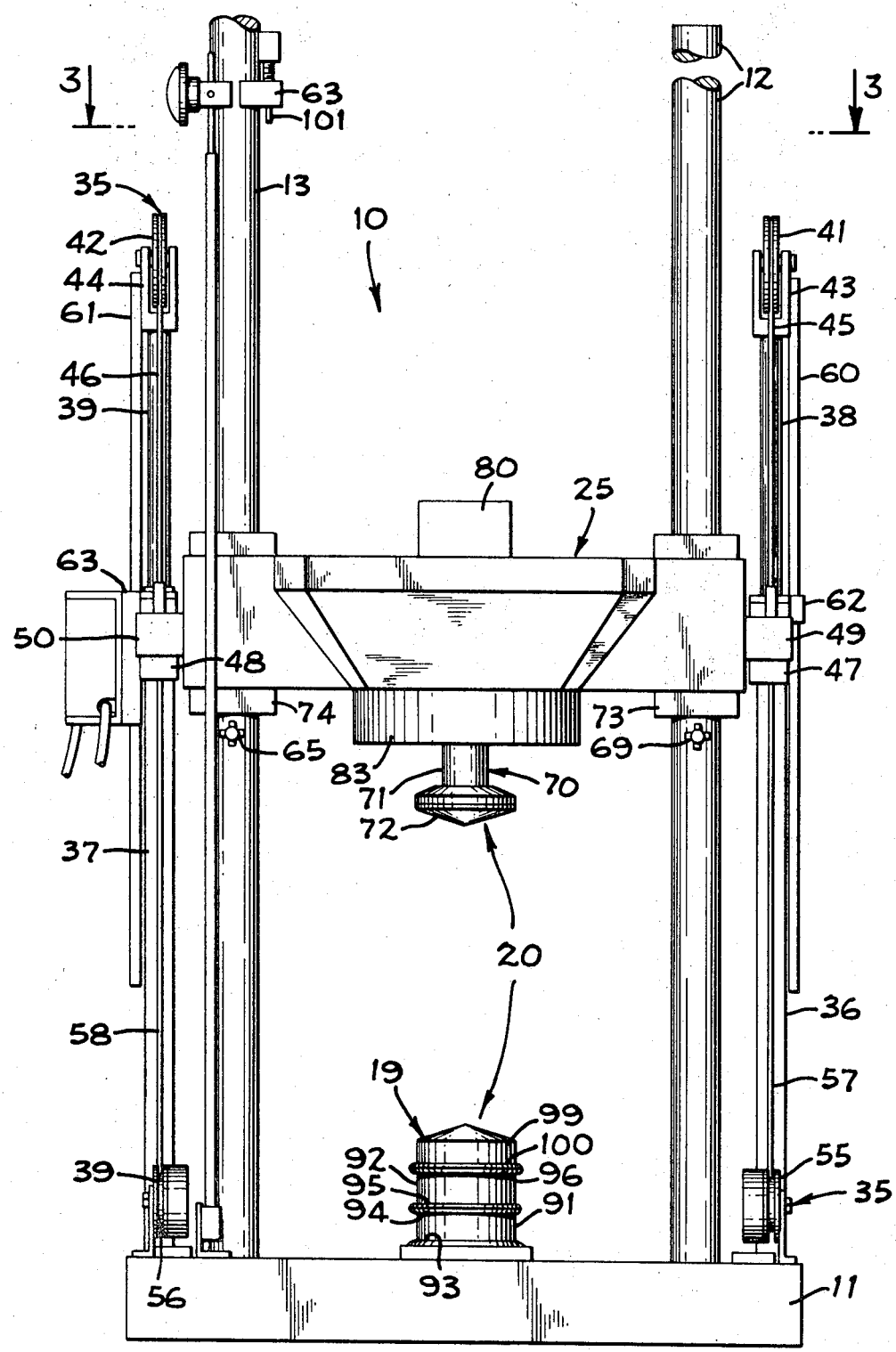
FIG_1

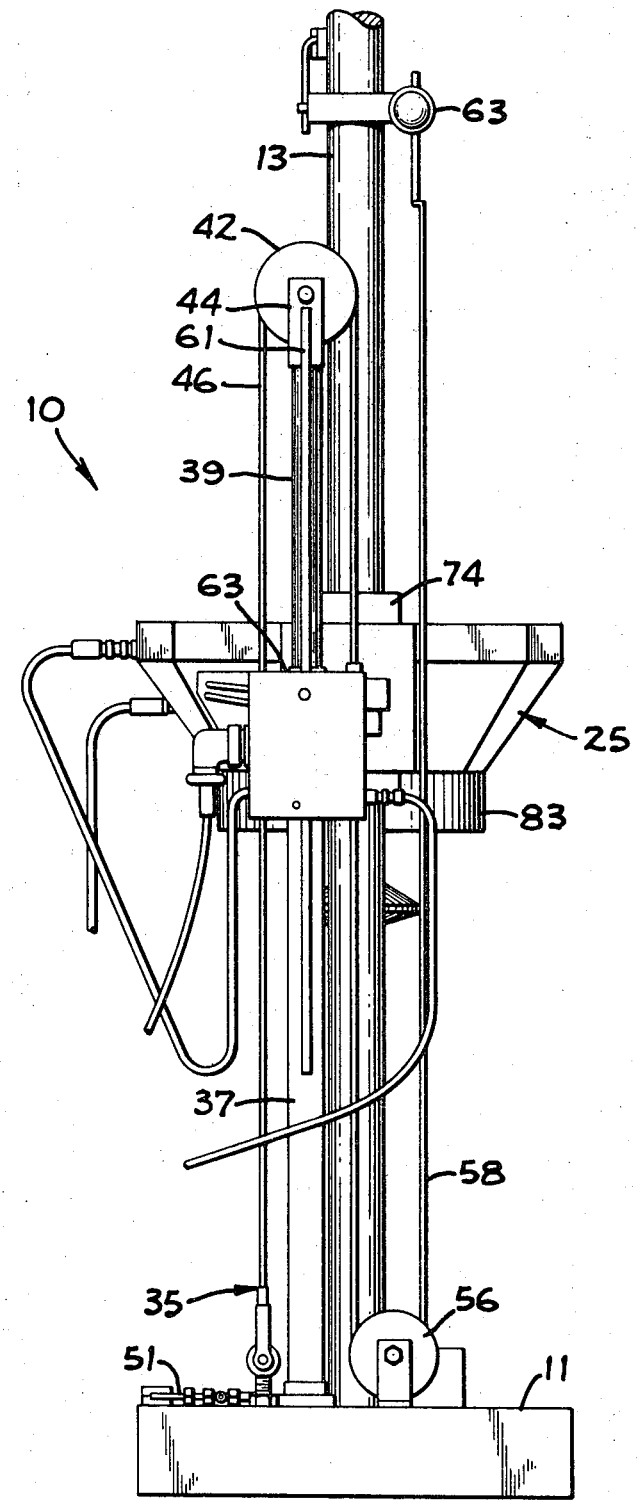
FIG_2

Patented May 4, 1971
3,577,763
4 Sheets-Sheet 3
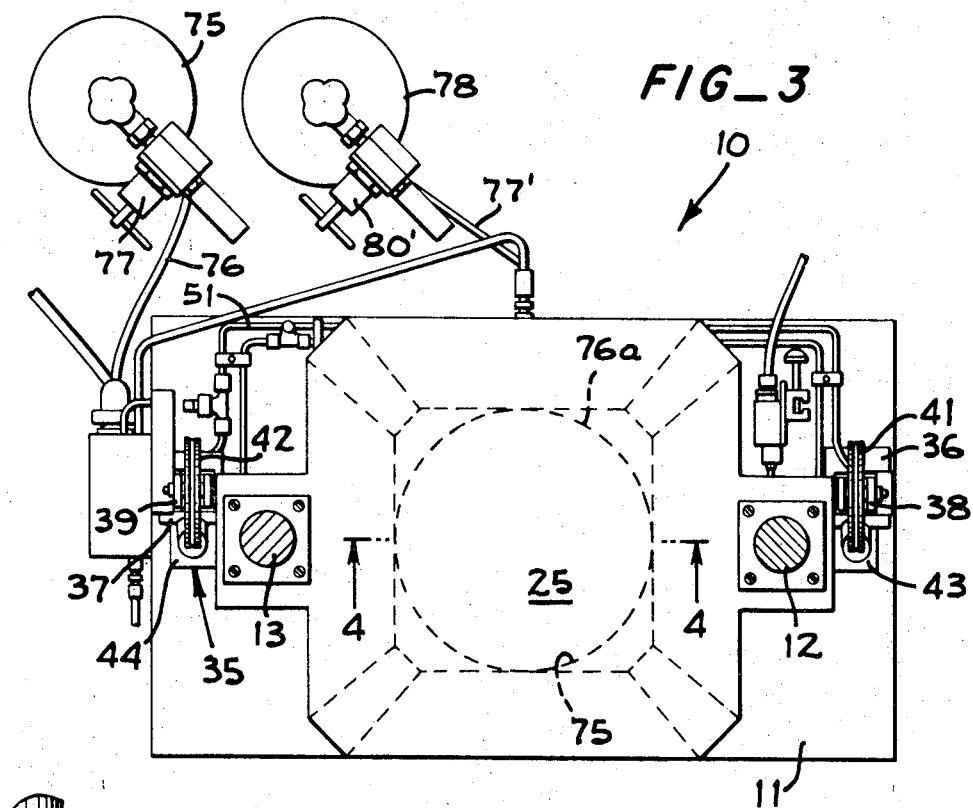
FIG_3
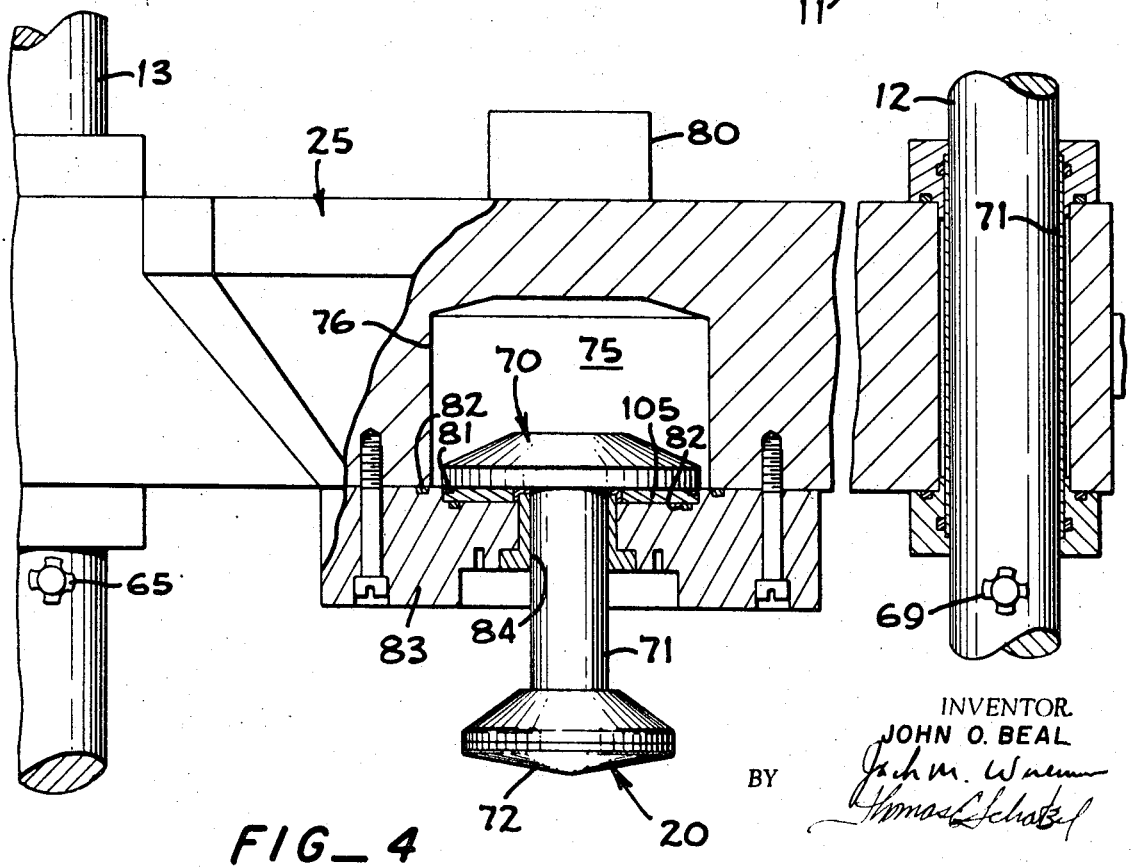
FIG_4
INVENTOR.
JOHN O. BEAL
BY
ATTORNEYS Patented May 4, 1971
3,577,763
4 Sheets-Sheet 4
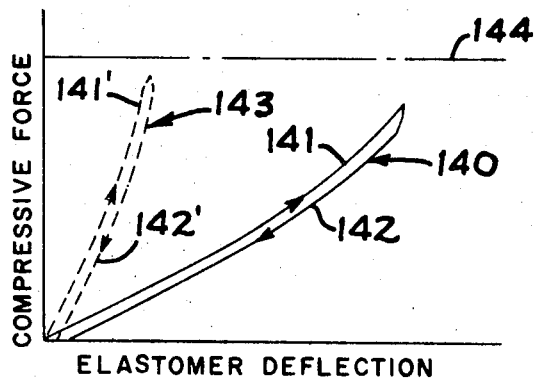
FIG_5
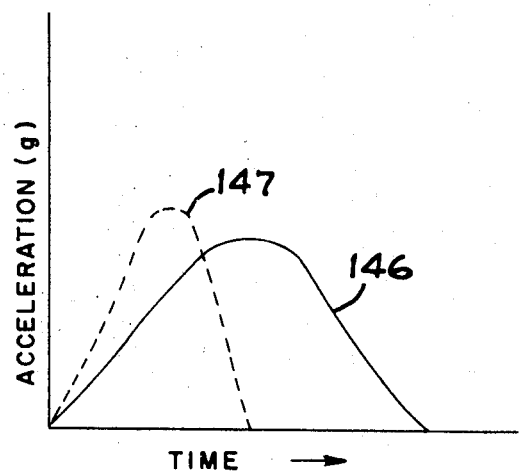
FIG_6
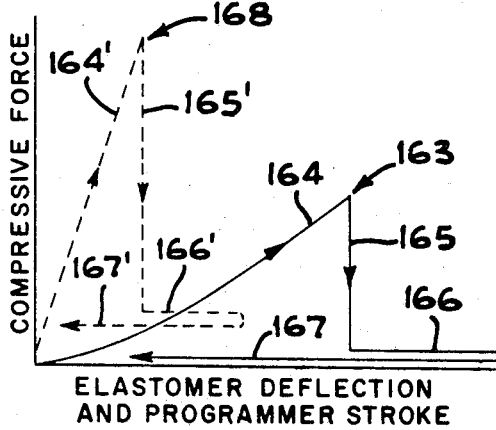
FIG_7
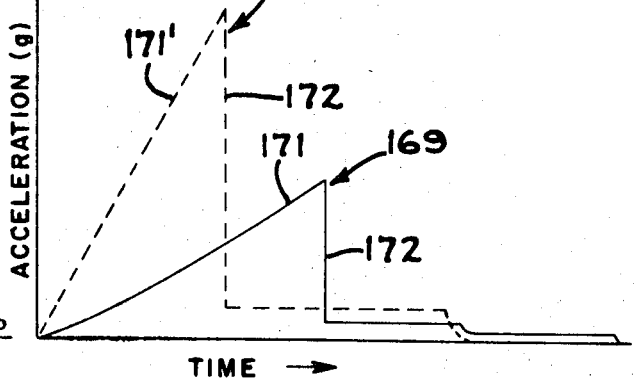
FIG_8
INVENTOR.
JOHN O. BEAL
BY
ATTORNEYS

APPARATUS FOR SELECTIVELY PROGRAMMING DIFFERENT TYPES OF SHOCK TESTS

BACKGROUND OF THE INVENTION

The present invention relates to shock testing apparatus, and more particularly to apparatus for selectively programming different types of shock tests.

Shock testing apparatus heretofore included a solid movable table for carrying a test specimen a relatively stationary reaction mass, and means for guiding the solid movable table toward the reaction mass under the force of gravity or through powered driven means. A shock programmer with a gas filled cylinder was placed between the solid movable table and the reaction mass to program the specific types of shock pulses desired from the shock test. The programmer with the gas filled cylinder was compressed between the movable solid table and the reaction mass. Shock testing apparatus of this type is disclosed in U.S. Pat. No. 3,402,593, issued to Frank C. Bresk et al. on Sept. 24, 1968 for Apparatus and Method For Selectively Programming Different Types of Shock Tests, and in U.S. Pat. No. 3,226,974, issued to Frank C. Bresk et al. for Shock Testing Apparatus.

SUMMARY OF THE INVENTION

The apparatus of the present invention for programming different types of shock tests employs a movable shock table having a gas-filled chamber therein for receiving a piston of a programmer disposed in series between the movable shock table and a reaction mass for controlling the shock pulse produced by the impact therebetween.

By having the piston of the programmer received by a gas-filled chamber formed in a shock table, the apparatus for programming different types of shock waves is not only more economical to produce, but, also, affords increased shock table drop height within a given height. Further, the apparatus for programming different types of shock waves has a higher resonant frequency for reducing distortion in shock pulses. With the shock table being formed with a chamber the apparatus is more economical to produce and also has improved performance.

BRIEF DESCRIPTION OF THE DRAWINGS

FIG. 1 is a front elevational view of the apparatus of the present invention for programming different types of shock waves.

FIG. 2 is an end elevational view of the apparatus shown in FIG. 1.

FIG. 3 is a top view of the apparatus shown in FIG. 1 taken along line 3—3 of FIG. 1.

FIG. 4 is a fragmentary enlarged vertical cross sectional view, partially in elevation, taken along line 4—4 of FIG. 3 to illustrate the movable shock table with a gas-filled chamber for receiving the piston of a programmer.

FIG. 5 is a force versus deflection diagram for the programmer precharged with sufficient high gas pressure to provide a half sine pulse.

FIG. 6 is an acceleration versus time waveform showing the half sine pulse resulting from the force deflection curve in FIG. 5.

FIG. 7 is a force versus deflection diagram for the programmer precharged with a gas pressure which will result in a sawtooth pulse.

FIG. 8 is an acceleration versus time waveform showing the sawtooth pulses resulting from the force deflection in FIG. 7.

DESCRIPTION OF THE PREFERRED EMBODIMENT

Illustrated in FIGS. 1—3 is the apparatus 10 of the present invention for programming different types of shock waves. The apparatus 10 comprises a suitable metal base plate or reaction mass 11. Fixed to the base plate 11 are upright metal guide rods or rails 12 and 13. Any suitable arrangement may be provided to secure the guide rods 12 and 13 firmly and securely to the base plate or reaction mass 11. Projecting upwardly from the reaction mass 11 and fixedly secured thereto is a well-known elastomer assembly 19 of a programmer 20.

Carried by the guide rods 12 and 13 for rectilinear up and down movement therealong is a movable metal shock drop table 25 of the present invention. For raising the shock table 25, a hydraulic lift arrangement 35 is employed. Any suitable lift arrangement may be used, such as the lift system disclosed in the aforesaid U.S. Pat. No. 3,402,593 or U.S. Pat. No. 3,226,974.

Briefly, the hydraulic lift arrangement 35 FIGS. 1—3) comprises upright cylinders 36 and 37, which are supported by the base plate 11 during the lifting of the shock table 25 and are retractable after the shock table is locked in the raised position by brakes. Disposed within the cylinders 36 and 37 are pistons with piston rods 38 and 39 projecting respectively therefrom. Fixed to the piston rods 38 and 39 are pulleys 41 and 42, respectively, through U-shaped brackets 43 and 44. Trained around the pulleys 41 and 42 are cables 45 and 46, respectively. One end of each of the cables 45 and 46 is fixed to the base plate 11. The other ends of the cables 45 and 46 a re attached to lifting lugs 47 and 48, respectively.

Fixed to the table 25 are lifting members 49 and 50, which are engaged by the lifting lugs 47 and 48 so as to lift the table 25 and the lugs 47 and 48 are removed from engagement with the lifting members 49 and 50, when the table 25 is locked by brakes in the raised position. For raising the pistons 38 and 39 from the cylinders 36 and 37, oil under pressure is supplied in a conventional and well known manner to the cylinders 36 and 37 by conduits 51 (FIG. 3).

Pulleys 55 and 56 mounted on the base plate 11 have lightweight cables 57 and 58. The cables 57 and 58 are spring loaded by the pulleys 55 and 56. The other end of the cables 57 and 58 are attached to the lugs 47 and 48, respectively. The purpose of the cables 57 and 58 is to maintain the cables 45 and 46 taut.

Depending from the pulleys 41 and 42 are guide rods 60 and 61 (FIGS. 1 and 2), which are received by caps 62 and 63 for the cylinders 36 and 37 to prevent the cylinders 36 and 37 from rotating into the path of the shock table 25. Mounted on the rail 13 is a conventional height switch 63. Safety stops 65 and 69 (FIG. 1) are removably attached to the rails 12 and 13.

Opening of the pressurizing conduit 51 causes oil under pressure to enter the cylinders 36 and 37. This action causes the raising of the piston rods 38 and 39 out of the cylinders 36 and 37. Thereupon, the pulleys 41 and 42 are elevated to lift the shock table 25 through the lugs 47 and 48 and the lifting members 49 and 50. After the shock table 25 is locked in the raised position on the rails 12 and 13 through the brakes thereof, the lifting lugs 47 and 48 are lowered from the drop table 25 and the cylinders 36 and 37 are fully retracted.

The shock drop table 25 is formed with sleeves 71 (FIG. 4) which received the guide rails 12 and 13, respectively, to enable the table 25 to travel in a rectilinear path along the guide rails 12 and 13. The release mechanism is the sleeves 71 (FIGS. 1 and 4) which are compressed to lock the table 25. Gas under pressure, such as nitrogen gas, is supplied to the exterior wall of the sleeves 71 from a cylinder 75 (FIG. 3) through suitable conduits 76 and a pressure regulator 77. The sleeves 71 are also pneumatic rebound brakes which are also controlled by means of a solenoid controlled gas line, which serve to compress the sleeves 71 after the table 25 has rebounded upwardly following a completed shock pulse. The above described braking arrangement is well known in the art. Mounted on the drop table 25 is a test specimen 80 (FIG. 1).

In order to program a drop test, the programmer 20 (FIG. 1) is interposed between the drop table 25 and the reaction mass 11. The programmer 20 includes the elastomer pad assembly 19 (FIG. 1) and a piston 70 (FIGS. 1 and 4) with a piston rod 71 and a bumper 72 fixed to the distal end of the piston rod 71.

According to the present invention, the shock drop table 25 is a table formed with a chamber 75 (FIG. 4). The wall 76 of the chamber 75 is cylindrical. MOvable within the chamber 75 in a rectilinear path is the piston 70 of the programmer 20. Thus, the table 25 forms a cylindrical wall 76 for the piston 70 of the programmer 20.

A flexible high pressure line 77' (FIG. 3) is connected to a source 78 of gas under pressure, such as nitrogen gas under pressure of 2000 pounds per square inch. The high-pressure line 77' is in communication with the chamber 75 so that a gas filled chamber is provided. For regulating the pressure of the gas in the chamber 75, a regulator 80' is disposed in the high pressure line 77'. At the lower portion of the chamber 75 is located a suitable face seal 81. O-rings 82 serve as seals to eliminate leakage of the gas under pressure from the chamber 75.

Fixed to the table 25 by bolts is a mounting block 83 (FIGS. 1 and 4) which has a central bore 84 for receiving the piston rod 71. The bumper 72 serves as an impact head for the programmer 20 and is formed of elastomer material, such as hard rubber.

The elastomer pad assembly 19 of the programmer 20 comprises a plurality of elastomer discs 91—92 (FIG. 1) of natural rubber. Metal mounting disc 93—96 are provided for each face of the elastomer discs 91—92. A top elastomer 99 has a metal disc 100 on the lower face thereof. Thus, impact between the piston 70 and the elastomer assembly 19 is elastomer to elastomer.

In the operation of the apparatus 10 for selectively programming different types of shock tests, the specimen 80 is bolted to the top of the drop table. The lift assembly 35 is operated to raise the drop table 25 to a prescribed height. When the table 25 is at the prescribed height, a rod 101 actuates the height switch 63 to stop the flow of oil to the cylinders 36 and 37. The sleeves 71 are compressed to lock the table 25 in the elevated position. Now the lifting members 47 and 48 are lowered from the path of the lifting members 49 and 50 of the table 25 and the cylinders 36 and 37 are fully retracted. Thus, the lifting members 47 and 48 are lowered to a position below the disc 99 of the elastomer assembly 19. Now, the sleeves 71 are permitted to expand and the table 25 falls freely under the force of gravity. At the bottom of the fall, the impact head 72 of the piston 70 collides with the top disc 99 of the elastomer assembly 19.

In order to obtain a half sine pulse with the described programming structure, the cylinder precharged pressure is adjusted to be high enough that the force of the gas pressure acting on the area of the top piston 70 is greater than the force of the drop impact. In this way the cylinder and piston assembly remains locked throughout the drop test, and the shock pulse is programmed entirely by the elastomer programmer assembly 19.

After the chamber 75 is properly precharged, the drop table 25 with a test specimen 80 mounted thereon is raised to the desired height, and then released as previously described. When the impact head 72 strikes the elastomer programmer assembly 19, a spring curve of force versus deflection as shown in FIG. 5 results from the action of the elastomer unit 19. The solid line curve 140 in FIG. 5 results from a relatively soft arrangement of the elastomer unit 19. A soft arrangement is accomplished by using elastomer discs 91, 92 and 99 relatively soft rubber or using more or thicker elastomer discs. Conversely, the elastomer unit 19 can be stiffened by using harder elastomer discs, or fewer or thinner discs. In curve 140, the portion 141 represents the force versus deflection as the impact head 72 moves downwardly to compress the elastomer assembly 19 and the portion 142 represents the force versus deflection as the elastomer unit 19 rebounds to move the impact head 72 and drop table 25 back up. The dash line 143 in FIG. 5 is a curve similar to curve 140 but showing the spring rate which results from a stiffer arrangement of the elastomer unit than was used to obtain curve 140. In curve 143 the up and down leg portions are similar to portions 141 and 142 of curve 140 and are designated with primed reference numbers.

The dot-dash line 144 in FIG. 5 represents the outward force exerted by the gas in the chamber 75 acting on the top of piston 70. Since the maximum inward force exerted on the piston 70 by the drop, as represented by the top of curves 140 and 143 is less than the outward force, the piston 70 remains locked in the chamber 75. In other words the piston 70 does not move relative to the drop table 25 during the drop test. If the weight of the test specimen and/or the drop height are substantially increased so that the top of curves 140 and 143 would be above line 144, the precharge pressure in the chamber 75 must be increased to maintain line 144 above the top of the resulting higher spring curve.

As is well known by those skilled in the art, a substantially straight spring rate as shown by line 140 in FIG. 5 results in a half sine shock pulse of acceleration versus time, as shown by curve 146 in FIG. 6. It should be noted that the term "acceleration" is used herein to define change in table velocity upon and after impact, including both the initial deceleration in the downward movement of the table and the following upward acceleration of the table when it stops moving down and is accelerated upwardly upon rebound. The dash line 147 in FIG. 6 is the half sine pulse which results from the spring rate 143 in FIG. 5. Thus, it will be understood that the duration of the half sine pulse can be adjusted by changing the stiffness of the elastomer programmer 19. More specifically, the duration can be increased by using a relatively soft elastomer programmer as shown by lines 140 and 146, and the duration can be decreased by using a stiffer elastomer programmer 19 as shown by lines 143 and 147. As is known by those skilled in the art, the peak acceleration for a given drop package weight can be adjusted by changing the drop height. More specifically, increasing the drop height increases the peak acceleration.

In order to obtain sawtooth pulses with the described programming structure, the pressure of the gas in the chamber 75 is reduced until the peak of the force deflection curve shown in FIG. 5 exceeds the force described by line 144 of FIG. 5. In other words, the force on the top of the piston 70 is the same as the force of impact. After the gas-filled chamber 75 and piston unit has been so adjusted, the drop table 25 is raised to the desired height and then released as previously described. When the impact head 72 on the end of the piston rod 71 impacts upon the elastomer programmer 19, the result is a force deflection curve as shown in FIG. 7.

The solid line spring curve 163 in FIG. 7 will now be described in detail. The first action which occurs on impact is that the elastomer programmer 19 compresses to provide the spring leg 164. After the compressive force of the elastomer programmer 19 reaches the magnitude of the force of the precharge pressure in the chamber 75 acting on the upper surface of the piston 70, the piston 70 moves inwardly and breaks away from the face seal 81. At the instant this occurs the precharge gas in the chamber 75 flows across the side of the piston 70 and acts against the outer face of the piston. It will be understood that before the piston breaks away from the face seal 81, the gas force pushing the piston 70 outwardly is the product of the unit gas pressure in the chamber 75 times the total projected area of the upper face of the piston 70; or in other words, the total force is unit gas pressure times the total cross section area of the piston measured in a plane normal to the axis of the piston rod 71. When the piston 70 breaks away from the face seal 81, however, the outward force becomes only the unit gas pressure in the chamber 75 times the cross section area of the piston rod 71. The reason of course is that after break away the gas pressure is the same on both the inner and outer faces of the piston 70 except for the area of the piston rod 71. Thus, it is important that the cross-sectional area of the piston rod 71 be substantially smaller than the cross section area of the piston 70. In a preferred embodiment the cross section area of the piston rod 71 is only about ten percent of the cross section area of the piston 70. The sudden decrease in force on the piston upon breakaway is also enhanced by the fact that the outer face of the piston is vented to atmosphere by the leakage vent around the piston rod so that there will be no possibility of some precharge pressure acting on the outer face of the piston prior to breakaway. It is further important in obtaining maximum change in force on the piston upon breakaway to have the outer face of the piston substantially coplanar with the top of the end wall structure, so that there will not be an appreciable volume below the outer face of the piston to bring up to precharge pressure upon breakaway. The result of the described construction is to cause the outward force on the piston, and therefore the force on the drop table, to decay to about 10 percent of the peak force of leg 164 in about 1 millisecond or less when the piston breaks away from the face seal, as shown by the leg 165. The piston then strokes inwardly on the low force leg 166 until the velocity of the drop table reaches zero. Then the piston strokes outwardly to provide the spring leg 167. The dash line spring curve 168 in FIG. 7 is obtained by employing a stiffer elastomer programmer 19 and a higher precharge pressure than was the case for the solid line curve 163. The various legs of the spring curve 168 are similar to those described for for curve 163 and are identified as primed reference numbers.

As is well known by those skilled in the art the spring curve 163 in FIG. 7 will result in a shock pulse 169 as shown in FIG. 8. Similarly the spring curve 168 will result in a shock pulse 170, and obviously both of the pulses 169 and 170 are sawtooth-shaped pulses. In the case of the sawtooth pulses shown in FIG. 8, the peak acceleration is a function of the precharge pressure. More specifically, higher precharge pressure results in higher peak acceleration. The rise time to the peak acceleration as shown by legs 171 and 171' in FIG. 8 is a function of the stiffness of the elastomer programmer 19 and the drop height. A stiffer elastomer programmer results in a decrease in the rise time, and a higher drop height also results in a decrease in the rise time. The substantially vertical decay of the pulse as shown by legs 172 and 172' is a result of the piston breaking away from the face seal 81. It will be recalled that since there is a restricted escape passage formed by aperture, the pressure on the outer face of the piston drops to about atmospheric pressure soon after the piston strokes outwardly and reseats on seal so that sawtooth pulses can be quickly repeated. Since the escape passage is a restricted passage and since the time from breakaway to reseating on seal is extremely short, the amount of gas lost after breakaway is negligible.

As previously discussed, the time required for the decay portion of the pulse is dependent only on the time required for the pressure on the outer face of the piston to build up to the pressure on the inner face of the piston after the piston breaks away from the face seal. The decay time is not dependent on the stiffness of the reaction mass as it has been in the case of using crushable lead cones as sawtooth programmers.

I claim:

1. Apparatus for selectively programming different types of shock tests comprising a shock table for carrying a test specimen, said table being formed with a cylindrical wall therein, said cylindrical wall defining a cylindrical chamber, a source of gas under pressure communicating with said chamber to supply said chamber with gas under pressure, reaction means spaced form said table and disposed in alignment with said cylindrical wall, means received by said table for guiding said table for movement toward said reaction means, yieldable means mounted on said reaction means in alignment with said cylindrical wall, and a piston disposed in said chamber with a piston rod projecting out of said chamber and in alignment for impact with said yieldable means when said table is moved toward said reaction means.

2. Apparatus as claimed in claim 1 wherein said source of gas includes means for regulating the pressure of the gas supplied to said chamber.

3. Apparatus as claimed in claim 2 wherein said piston rod has an elastomer impact pad at the free end thereof for engaging said elastomer assembly for impact therewith.

4. Apparatus as claimed in claim 1 wherein said yieldable means is an elastomer assembly.

5. Apparatus as claimed in claim 3 wherein said yieldable means is an elastomer assembly.

6. Apparatus for selectively programming different types of shock tests comprising a shock table for carrying a test specimen, said table being formed with a cylindrical wall therein, said cylindrical wall defining a cylindrical chamber, a source of gas under pressure communicating with said chamber to supply said chamber with gas under pressure, reaction means spaced from said table and disposed in alignment with said cylindrical wall, a piston disposed on said chamber with a piston rod projecting out of said chamber, and means received by said table for guiding said table for movement toward said reaction means.

7. Apparatus as claimed in claim 6 wherein said source of gas under pressure is of a magnitude to lock said piston with said table.